United States Patent [19]
Henry et al.

[11] Patent Number: 5,687,798
[45] Date of Patent: Nov. 18, 1997

[54] DOWN-PRESSURE SYSTEM FOR AGRICULTURAL IMPLEMENT

[75] Inventors: James Wayne Henry; David Robert Hundeby, both of Saskatoon; Mark Anthony Gerein, Martensville, all of Canada

[73] Assignee: Flexi-Coil Ltd., Saskatoon, Canada

[21] Appl. No.: 563,955

[22] Filed: Nov. 29, 1995

[51] Int. Cl.⁶ .................................................. A01B 73/00
[52] U.S. Cl. ........................... 172/311; 172/321; 172/456
[58] Field of Search ........................ 172/311, 2, 4, 172/4.5, 239, 242, 244, 321, 398, 407, 423, 456, 637, 640, 666

[56] References Cited

U.S. PATENT DOCUMENTS

| | | | |
|---|---|---|---|
| 4,600,060 | 7/1986 | Winter et al. | 172/4 |
| 4,630,526 | 12/1986 | Burk et al. | 172/311 X |
| 4,700,784 | 10/1987 | Wiebe et al. | 172/311 X |
| 4,721,168 | 1/1988 | Kinzenbaw | 172/311 |
| 4,821,806 | 4/1989 | Winter | 172/4 |
| 4,825,958 | 5/1989 | Kelderman | 172/311 X |
| 4,915,014 | 4/1990 | Gilmore et al. | 91/420 |
| 4,967,851 | 11/1990 | Barber | 172/311 |
| 5,065,681 | 11/1991 | Hadley | 111/55 |
| 5,154,240 | 10/1992 | Carrick | 172/311 |
| 5,161,622 | 11/1992 | Godbersen | 172/311 X |
| 5,348,101 | 9/1994 | Fox et al. | 172/2 |
| 5,427,182 | 6/1995 | Winter | 172/2 |
| 5,449,042 | 9/1995 | Lanophair et al. | 172/311 X |
| 5,484,025 | 1/1996 | Landphair et al. | 172/311 |

FOREIGN PATENT DOCUMENTS

| | | |
|---|---|---|
| 1074172 | 3/1980 | Canada . |
| 1077763 | 5/1980 | Canada . |
| 1096685 | 3/1981 | Canada . |
| 2109284 | 8/1995 | Canada . |

OTHER PUBLICATIONS

The Dynamite Disks John Deere Mar. 1991 date not confirmed.

*Primary Examiner*—Terry Lee Melius
*Assistant Examiner*—Christopher J. Novosad
*Attorney, Agent, or Firm*—Anthony Asquith & Co.

[57] ABSTRACT

The implement has a folding tool-bar, with a main section and wings. Hydraulic rams press the wings downwards relative to the main section during operation. Another ram presses the main-section downwards, reacting the force against a relatively weighty component, such as a air-cart. During non-operation, a carriage wheel is lowered, which raises the main section of the tool-bar off the ground. The wings also are raised clear of the ground. A sensor detects the position of the carriage wheel, and blocks movement of the wings downwards when the carriage wheel is lowered.

13 Claims, 8 Drawing Sheets

DOWN-PRESSURE SYSTEM FOR AGRICULTURAL IMPLEMENT

This invention relates to implements in which a tool-bar, or the like, is in relatively-moveable or foldable sections, and in which the requirement arises for exerting down-pressure between the sections.

BACKGROUND TO THE INVENTION

It is common for implements to include many ground-engaging tools on a tool-bar of the implement, where the need arises for the tools to engage the ground each with a substantial downwards force, in order to ensure that the tools are kept at the correct depth in the soil. Without adequate weight, the tools (angle disk openers, for example) might tend to ride too close to the surface. Tool depth is critical to tillage and seeding results.

As is well-known, if the tool-bar is too light, weights may be added thereto. However, the use of weights is cumbersome, and can be dangerous. Also, especially when the implement has a tool-bar of the foldable type, the extra weight makes lifting and folding the tool-bar a more difficult task.

The other approach is to use powered means, such as hydraulic rams, for the purpose of exerting a downwards force on a tool-bar. The invention follows this latter approach.

The invention is aimed at providing, on an implement of the type having a tool-bar in relatively foldable sections, a means for exerting a downwards force between the sections, and in particular, between a main section of the tool-bar and wing-sections that are pivotable with respect to the main section.

GENERAL FEATURES OF THE INVENTION

The means for controlling the positions and forces between the main section and the wings of the folding tool-bar should be designed to provide three conditions. First, the operational condition: in which the main section and the wing-sections are in alignment, and are in working-engagement with the ground; in which the main section is pressed down (the press-down force being reacted against the tractor or some other heavy item); and in which the wing-sections are pressed down relative to the main section.

The second condition is the fully-folded or stowed, non-operational condition, in which the wings are folded up to the maximum extent. In this condition, preferably any press-down forces acting on the main section are relieved or blocked. (The wings being raised above the non-operational condition, any press-down forces between the wings and the main section inevitably are now blocked or relieved.)

The third condition is the intermediate wings-raised, non-operational condition. Here, the wings are held up, i.e the wings are prevented from falling, and from being lowered, down into contact the ground. In this condition, the wings are blocked from descending below a certain predetermined height relative to the main section.

It is contemplated that, in the third condition, the press-down forces may still be applied to the mains section, but preferably, in the third condition, any press-down forces acting on the main section are relieved or blocked, and the main section is lifted or raised, preferably completely off the ground.

In this third condition, although the wings are held the small height clear of the ground, the wings are not folded right up to the stowed position. This third condition is used when the implement is being moved, between sessions of operation, whereby it only takes a moment for the main section and the wings to be dropped down, from the third condition, to the operational (first) position.

A retractable carriage may be provided for the main section. The carriage is lowered when the wings are in the non-operational conditions, so that the tools on the main section are raised clear of the ground. Alternatively, or in addition, a means other than a carriage may be provided for raising, or taking the weight of, the centre-section during non-operational periods, for example the main-section may be mounted on a three-point hitching system.

It is recognised that the means for providing press-down forces between the main section and the wings should be positively blocked or disabled when the wings are in the non-operational conditions. Thereby, the tractor driver or other operator of the implement cannot, during non-operation, inadvertently permit the forces to be applied that would drive the wings downwards. The position and force control system should be effective to prevent the wings from moving down below the pre-determined height.

It is recognised that the means for controlling the positions of, and forces on, the wings should permit the wings to be raised and lowered freely while the wings are above the predetermined height, but that the wings should be blocked from passing below the predetermine height.

Preferably, an interlock is provided that allows the driver to lower the wings below the predetermined height, i.e to their operational positions, only after, or at least not before, the main section has been lowered to its operational position.

Preferably, the system is such as to permit only a single ram to be provided for each wing. The single ram provides all the up/down movements of the wing, and provides the down-pressure or force transference between the wing and the main section. The manner of controlling the movement of the wings, as described herein, allows the one ram to serve all the up/down movements required of the wing. However, the various movements may be accomplished by two or more rams disposed in series or parallel, as the designer may deem preferable.

DETAILED DESCRIPTION OF PREFERRED EMBODIMENTS

By way of further explanation of the invention, exemplary embodiments of the invention will now be described with reference to the accompanying drawings, in which.

Figure 1:
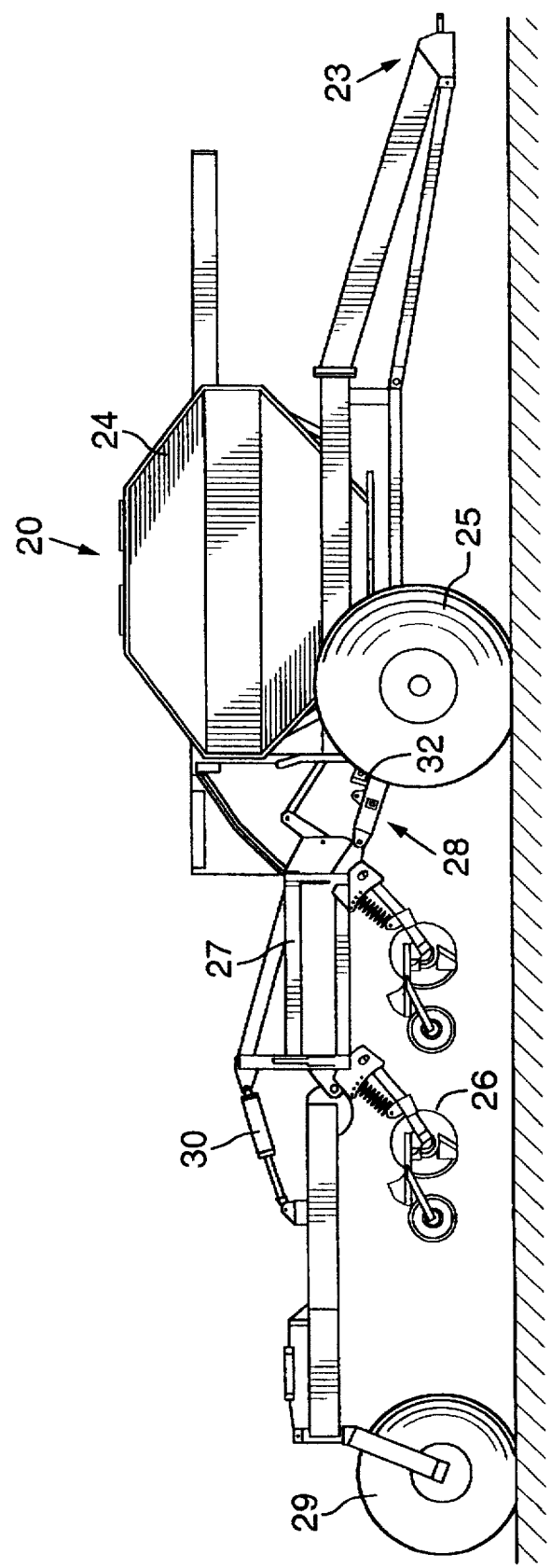
FIG. 1 is a side elevation of an agricultural apparatus, in which the tool-bar frame is in sections, and the wing-sections are pressured downwards in a manner that accords with the invention, the apparatus being shown in a wings-blocked, carriage-wheel-down, non-operational, condition.
Figure 6:
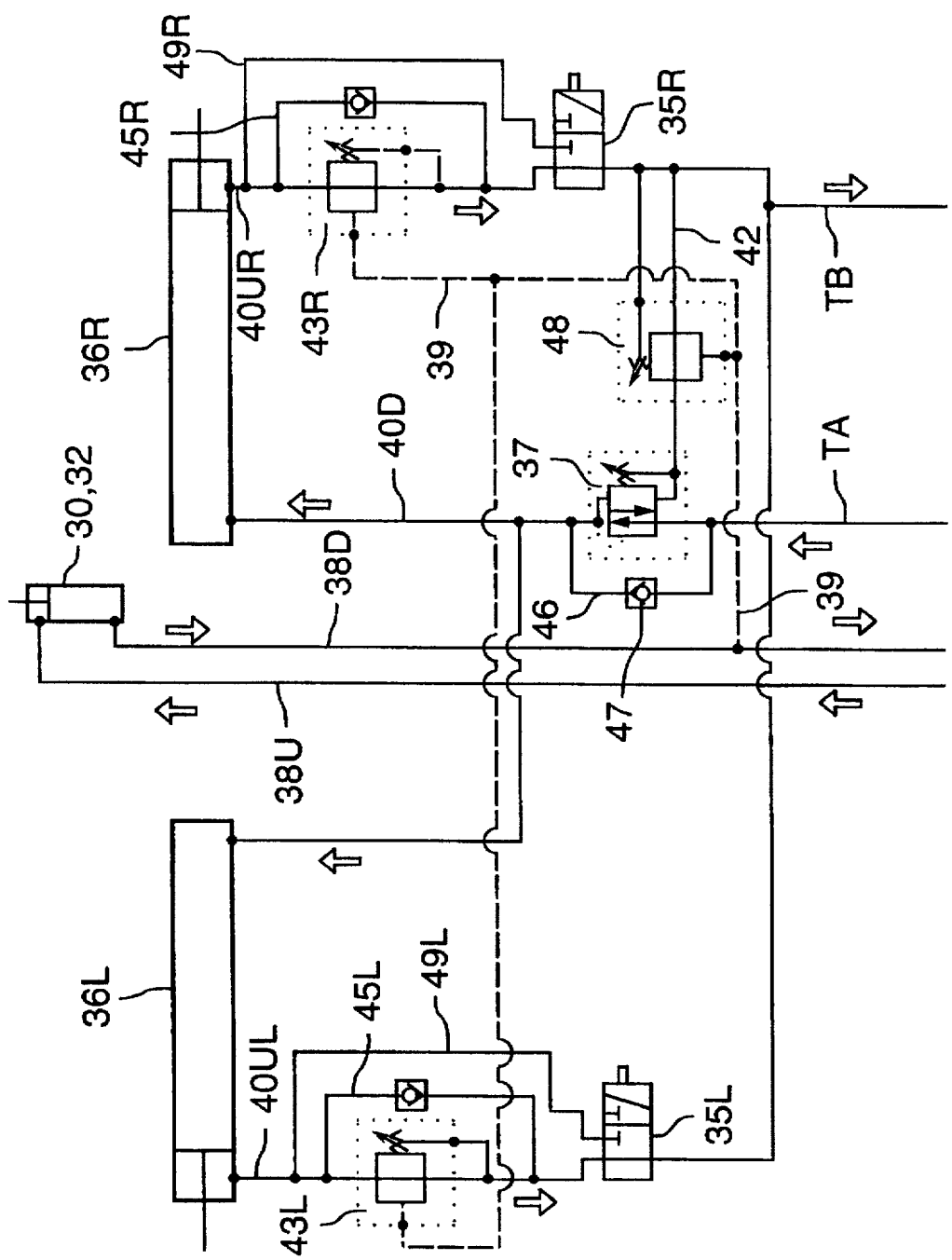
FIG. 6 is a diagrammatic plan view of the apparatus of FIG. 1, showing the manner of connecting the various hydraulic components of the apparatus, and shown with the apparatus in the operational condition, with the wings down, and the carriage retracted.
Figure 7:
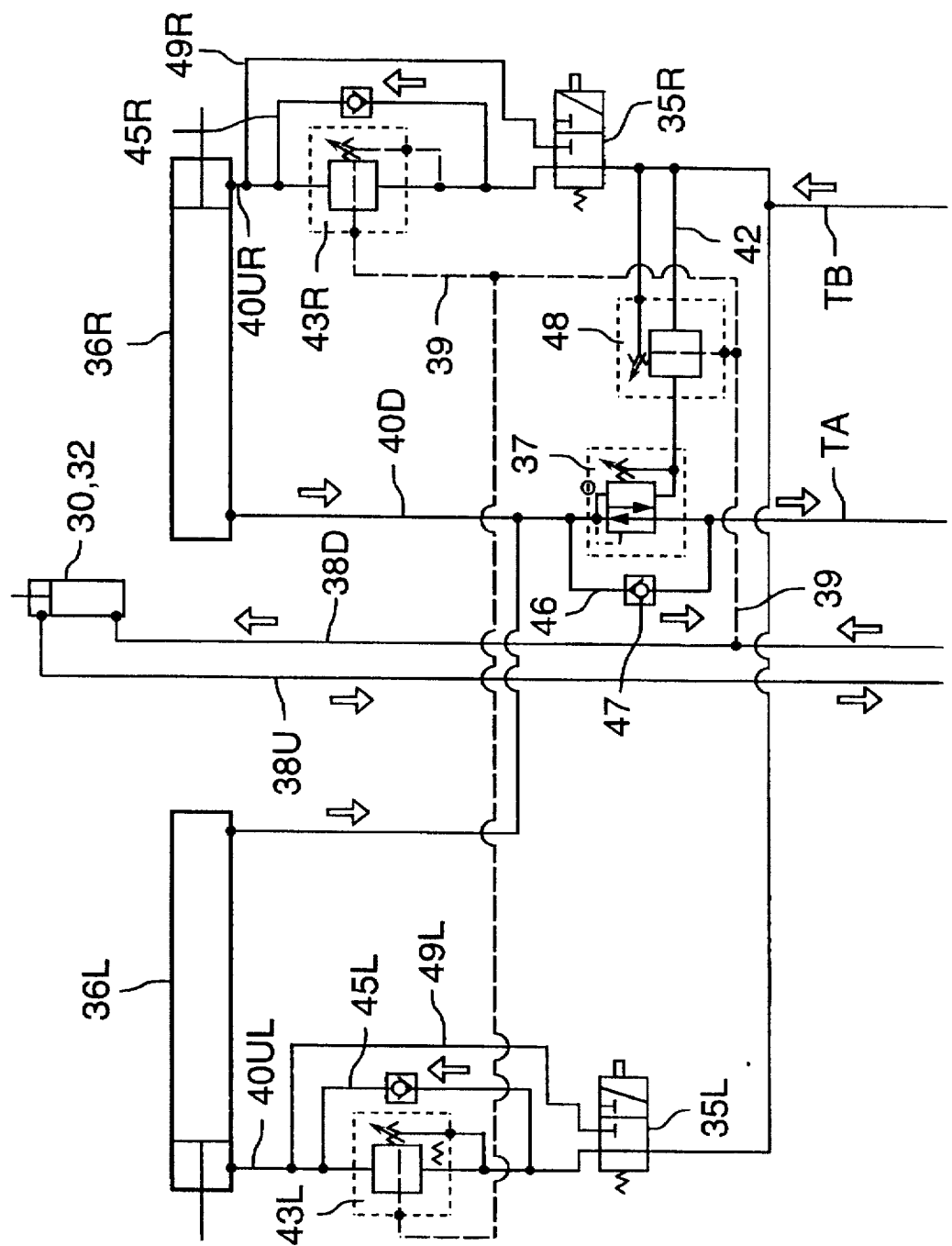
Figure 8:
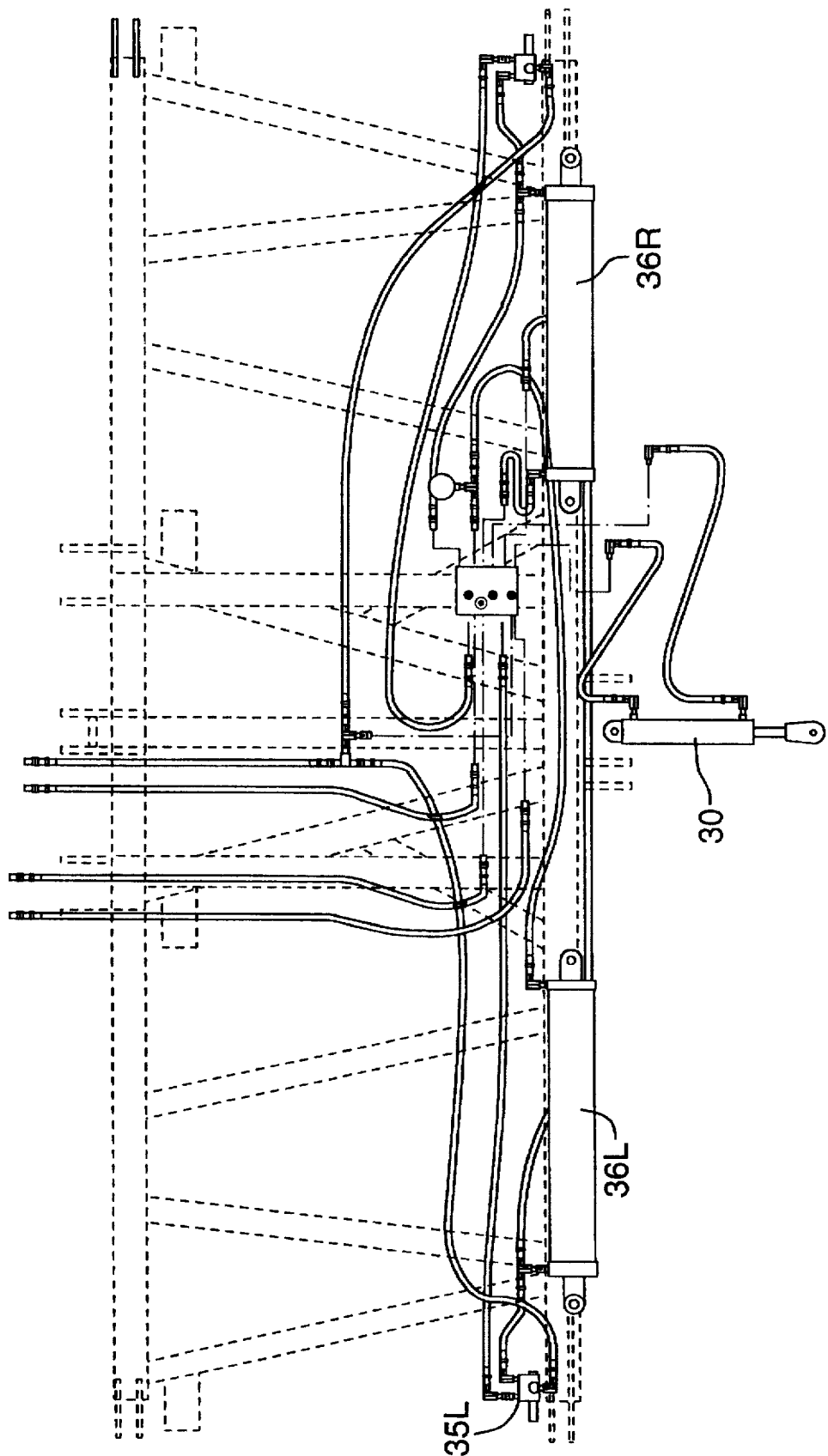

FIG. 7 the corresponding diagram to FIG. 6, but shown with the apparatus in the carriage down, wings up, non-operational condition;

FIG. 8 is a plan view of the apparatus of FIG. 1, showing the hydraulic circuit connections.

The apparatuses shown in the accompanying drawings and described below are examples which embody the invention. It should be noted that the scope of the invention is defined by the accompanying claims, and not necessarily by specific features of exemplary embodiments.

As shown in FIG. 1, an implement 20 is adapted for attachment, as at 23, to a tractor.

Figure 2:
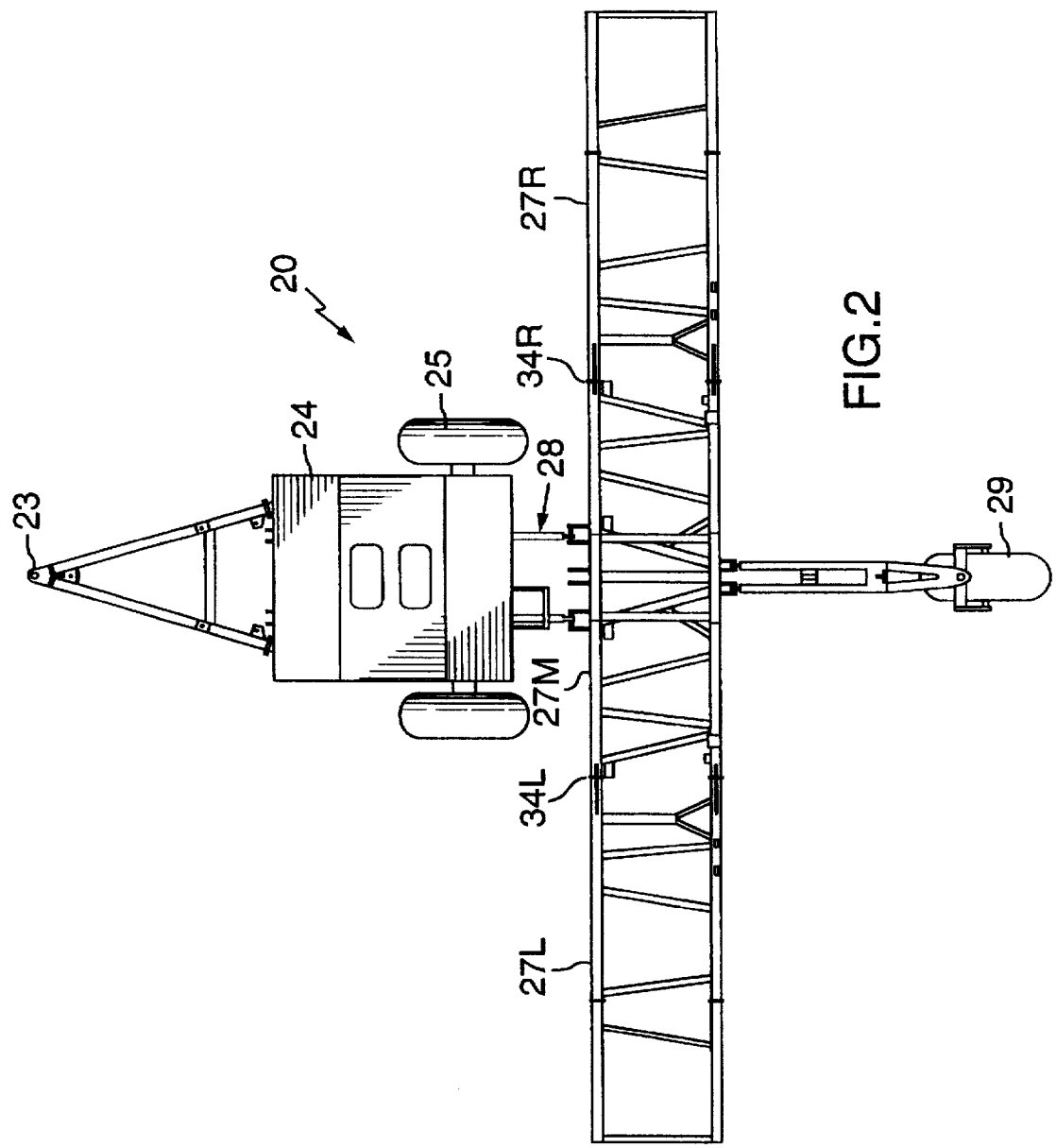
FIG. 2 is a plan view of the apparatus of FIG. 1.

A air-cart 24 of the implement is supported on wheels 25. Many ground-engaging elements 26 (opener disks, in this case) are disposed laterally across the width of the apparatus, the disks being mounted on a tool-bar 27. The tool-bar 27 is in three sections, being a centre or main section 27M, and left and right wing-sections 27L and 27R (FIG. 2). The disks 26 are disposed evenly underneath all three sections of the tool-bar 27.

The centre-section 27M of the tool-bar is carried behind the air-cart 24, and is hitched directly thereto. The hitching means 28 is such that the centre-section 27M is enabled to move in the up/down sense relative to the air-cart. The centre-section may be attached to the air-cart by hitching, trailing, mounting, or semi-mounting. (In some cases, the requirement may be for the main section to be attached directly to the tractor, rather than to an intermediate item such as the air-cart.)

A carriage wheel 29 is attached to the centre-section 27M. The carriage wheel 29 selectably provides support for the centre-section, i.e for lifting and supporting the centre-section so that the elements 26 are clear of the ground. The carriage wheel 29 is raisable/lowerable relative to the centre-section of the tool-bar by operation of the carriage wheel up/down hydraulic ram 30. When the carriage wheel 29 is raised, by operation of the ram 30, the elements 26 correspondingly descend and engage the ground, and become operational.

As mentioned, during operation of the apparatus, simply the weights of the tool-bar and elements by themselves are not enough to make the elements engage deeply enough into the ground, i.e the weight of the tool-bar 27 is not sufficient to ensure good ground penetration of the elements 26. The apparatus provides an extra downwards force on the centre-section 27M, the force being furnished by a suitable means acting between the centre-section and the air-cart 24. That is to say, a centre-section press-down actuator is provided, which, during operation, presses downwards on the centre-section of the tool-bar.

Conveniently, that downwards force on the tool-bar is balanced, i.e reacted, by an upwards reaction force on the air-cart. In FIG. 1, the centre-section press-down actuator comprises an hydraulic ram 32 (or, as shown, two rams, in parallel), which, in combination with the hitching means 28, serves to exert the downwards force on the centre-section 27M of the tool-bar. It will be understood that when this ram 32 is operated, the load on the cart wheels 25 is somewhat reduced, a portion of the weight of the air-cart now being transferred to the tool-bar, and thence to the elements 26.

The hydraulic pressure to the ram 32 should be adjusted to a setting that will give a position of the centre-section required for the particular operation, as deemed appropriate by the farmer.

Figure 3:
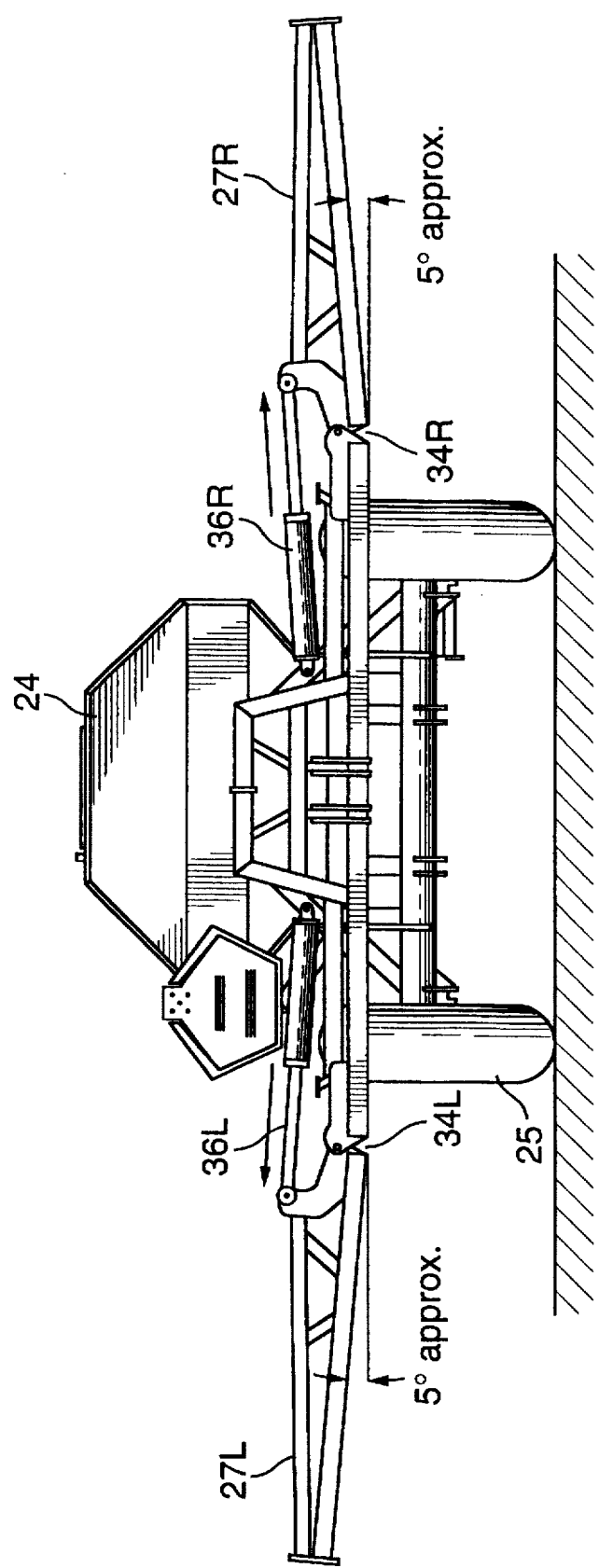
FIG. 3 is a rear elevation of the apparatus shown in FIG. 1.
Figure 4:
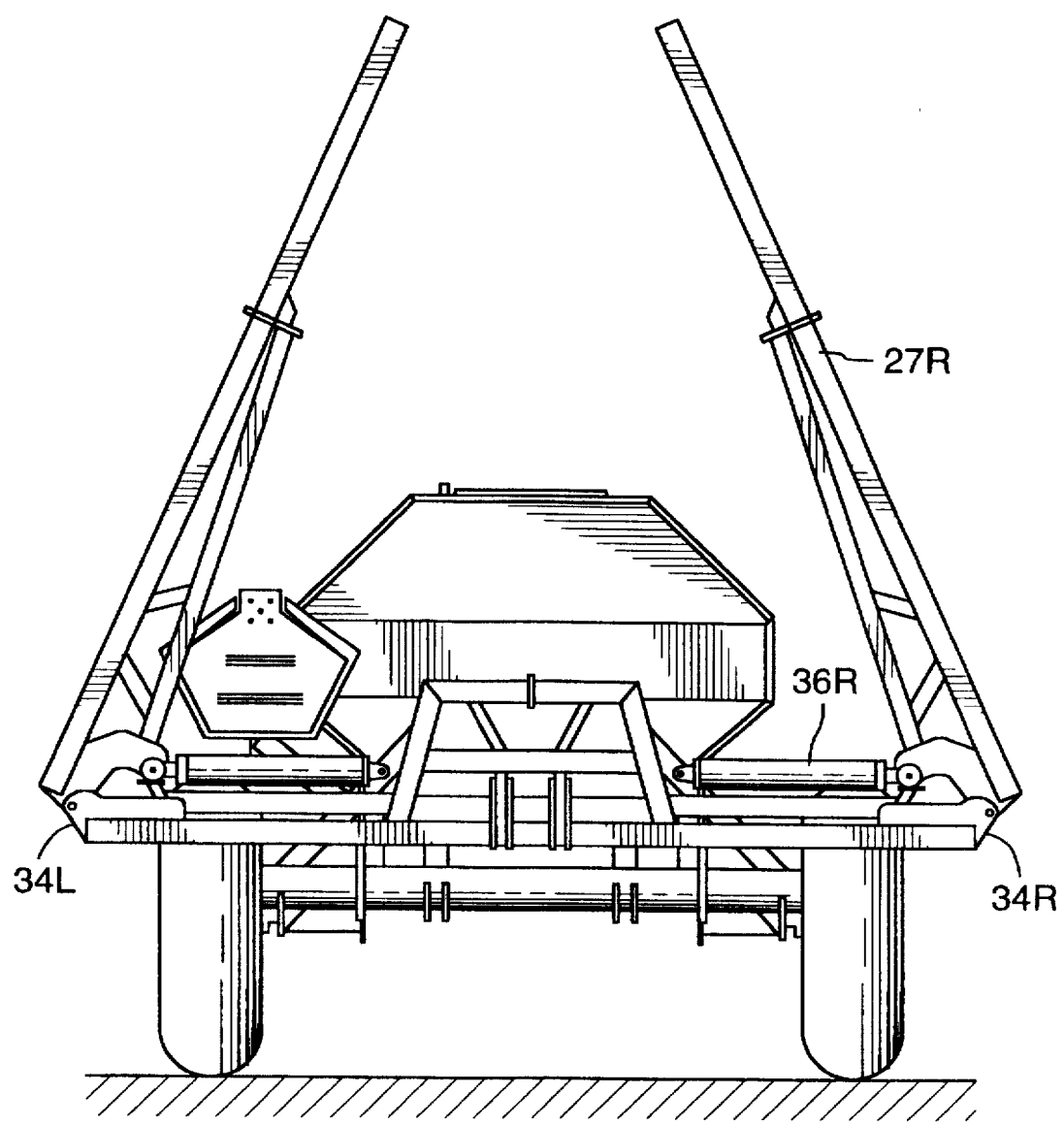
FIG. 4 is the same view as shown in FIG. 3, but with the apparatus in a wings-stowed, non-operational condition.

The wings 27L,27R of the tool-bar are hinged to the centre-section 27M at hinge-pivots 34L,34R. The wings are pivotable between a non-operational, folded-up or stowed position, as in FIG. 4, and a wings-down, but still non-operational, or wings-blocked position, as shown in FIG. 3. In FIG. 3, the wings are supported to the extent that the elements 26 are clear of the ground, and, in this position, the wings are blocked from moving down into the fully operational, ground-engaging position.

The apparatus is so arranged that the wings are supported in the FIG. 3, blocked, position when the carriage wheel 29 is down, i.e when the carriage wheel is supporting the elements of the centre-section clear of the ground. Thus, when the carriage wheel is down, and supporting the tool-bar, the wing-sections are blocked from moving down to their ground-engaging operational position. When the carriage is down, the wings may be raised and lowered between the FIG. 3 and FIG. 4 positions, but may not be lowered below the FIG. 3 position.

The blocked position of each wing, as shown in FIG. 3, is defined and set by the positional setting of a respective button-operated hydraulic valve. There are two such valves 35L,35R—one to each wing—whereby the setting of the blocked positions of the two wings may be adjusted independently. The right wing button-valve 35R is shown in close-up in FIG. 5.

The button-valves 35L,35R are associated with the hinge-pivots 34L,34R, whereby the blocked position is defined by a certain pivot angle of the wing. For example, as shown in FIG. 3, the blocked position is set with the wing at about five degrees to the horizontal. When the carriage wheel 29 is down, the wings are blocked from descending when at or below the five degree position, by the action of the button-valves 35L,35R.

The operation of the hydraulic circuit to achieve this function will be described presently.

The wings 27L,27R are raised and lowered by means of hydraulic wing-rams 36L,36R. These rams have a long enough stroke to raise the wings to the stowed position (FIG. 4) and to lower the wings through the blocked position (FIG. 3) and down to the operational position.

In the lowered, operational position of the wings (the carriage wheel 29 being raised and retracted before the wings can be moved to the lowered, operational position), the wings are lowered far enough down so as to be in operative alignment with the centre-section 27M, and the elements on the wing-sections are in operative engagement with the ground. During operation of the apparatus, the movement of the wings is unblocked.

Some of the weight of the centre-section 27M (which includes the added weight due to the transference of some of the weight from the air-cart to the centre-section) is transferred to the wing-sections 27L,27R. This transference is done via the wing-rams 36L,36R.

In addition to their use in folding up and lowering the wing-sections, the wing-rams 36L,36R are used to provide the press-down force on the wing-sections. The wing-rams act between the wing-sections and the centre-section, whereby the reaction to the wing-press-down force exerted by the wing-rams on the wings is taken by the centre-section; that is to say, the downwards force on the wing-sections is reacted as a lightening of (some of) the weight on the centre-section.

During operation, the wing-sections are in operative alignment with the centre-section, That is to say, the wings may pivot about their hinges so as to accommodate differences in ground level, differences in soil consistency, etc. The downwards force on the elements carried by the wings remains equalised to the downward force on the elements carried by the centre-section, even when the wings are undergoing the pivoting movement. The pressure-area of the wing-rams is designed accordingly, and pressure to the wing-rams is regulated to the set pressure as determined by the equalisation requirement.

The hydraulic pressure regulator 37 is of the kind in which the pressure to be regulated can be adjusted, and the designer may provide that that adjustment is done either by manual adjustment by a person when the implement is at rest, or by adjustment by the driver of the tractor during operation, or in some other suitable manner. The regulator 37 is of the pressure-relieving, pressure-reducing kind, which, when required, allows further hydraulic fluid from the pump on the tractor to compensate for a reduced pressure in the wing-ram, and also, when required, enables excess pressure in the wing-ram to be dumped back to the reservoir on the tractor.

During operation of the implement, therefore, the hydraulic pressure in the wing-rams remains constant, even if the wings are moving up/down due to ground unevenness.

The wing-rams, as mentioned, not only provide the motion required to raise and lower the wings to the stowed position, but also provide the down-force equalisation between the wings and the centre-section.

FIG. 6 shows the hydraulic circuit, with the components of the circuit in their operational status. The centre-section press-down hydraulic actuator-ram 32 is not shown in FIG. 6. The operation of that ram, and the pressure regulation thereof, is controlled independently of the components shown in FIG. 6.

The carriage-ram 30 may be operated so as to raise or retract the carriage wheel 29. When the wheel 29 is raised, there is high pressure in the carriage-up conduit 38U, and low pressure in the carriage-down conduit 38D. When the wheel 29 is raised, pressure in the pilot line 39 is therefore low, whereby the various pilot-operated components are in the normal-biassed state, as shown in FIG. 6.

The carriage-up conduit 38U may be termed the main-section-down conduit, and the carriage-down conduit 38D may be termed the main-section-up conduit. These terms cover the case, for example, where the main-section is raised and lowered by means of a three-point hitch.

Pressure is supplied (from the tractor) via tractor-conduit TA, to the wing-rams via the wing-down conduit 40D, and returned via the two wing-up conduits 40UL,40UR, and via the tractor-conduit TB. The wing press down force regulator, i.e the pressure-reducing, pressure relieving hydraulic pressure regulator 37, controls the pressure in the wing-down conduit 40D. During operation, if the pressure in conduit 40D becomes larger than the regulator setting (as the wings pass over a wing-raising 8 undulation in the ground, for instance) the excess pressure passes to the tractor conduit TB via the dump-conduit 42.

After the session of operation, the wings are raised by reversing the flow in the tractor-conduits TA and TB. This puts all the weight that has been distributed equally over the three sections of the tool-bar all onto the centre-section 27M. Therefore, when it is time to raise the wing-sections, the carriage-wheel 29 is lowered first, whereby the carriage wheel, not the elements of the centre-section, supports the extra weight on the centre-section as the wing-sections are raised clear of the ground. The carriage wheel is lowered by reversing the pressures in the carriage-conduits 38U,38D. In the case where the centre-section is supported (wholly or partly) by a three-point hitch between the centre-section and the air-cart, the three-point hitch would be operated to raise the centre-section as the wing-sections are raised clear of the ground.

With the carriage wheel 29 lowered, the pressure in the carriage-down conduit 38D is now high. Therefore, the pressure in the pilot line 39 is also high, and so the various pilot-operated components now are moved to their pilot-biassed positions. This condition is shown in FIG. 7.

In FIG. 7, pressure from the tractor is now fed to tractor-conduit TB, and returned via TA, whereby the wing-sections are driven upwards. Pilot-operated valves 43 are biassed closed at this time, but hydraulic fluid can flow in the wing-up direction through by-pass conduits 45L,45R, and the by-pass conduit 46 around the regulator 37, flow being permitted in that direction through the check-valves 47. At this time, the pressure in the conduit TB is higher than the pressure in conduit TA, and pilot-operated valve 48 closes off the dump-conduit 42 to prevent back-flow therethrough.

In FIG. 7, in which the wheel 29 is down, if pressure were supplied to the conduit TA—is to say, if the tractor driver selected to drive the wings downwards to the operational position—such flow is blocked. In FIG. 6, with the carriage wheel 29 retracted and the pilot valves 43L,43R open, fluid could flow out of the up-sides of the wing-rams 36L,36R via the conduits 48UL,48UR back to the tractor. But when the carriage wheel 29 is down, as in FIG. 7, the pilot valves 43L,43R are closed, and that flow is blocked. At the same time, the check valves 47 also prevent fluid from leaving the up-sides of the wing-rams. Therefore, when the pilot-valves 43L,43R are closed, due to the carriage wheel 29 being down, as in FIG. 7, the wings can be raised by supplying pressure in TB, but the wings cannot be lowered by supplying pressure in TA. In FIG. 7, i.e when the carriage wheel is down, if TB is pressurised, fluid can pass through the check valves, and the wings can rise, even though the pilot-valves 43L,43R are closed; but if TA is pressurised, no fluid can leave the up-side of the wing-rams, and downwards movement of the wing-ram is effectively blocked.

In fact, in FIG. 7, the wings can be raised (by pressurising TB) right up to the fully-stowed position (FIG. 4), or the wings may be parked at an intermediate-raised position.

The operational effect of the button-operated valves 35L, 35R may be understood from FIG. 7. The carriage wheel 29 is down, and the pilot-operated valves 43L,43R,48 are consequently closed. As mentioned, in that condition the wings can be raised, but they cannot be lowered. Or rather, the raise-but-not-lower restriction only applies to the lower portion of the up/down movement of the wings, i.e the portion of the up/down movement of the wings below the pre-determined height of the wing. Above the pre-determined height of the wing, the wing can be moved both up and down. For proper operation, the designer must make it possible for the tractor driver to lower the wings from the stowed position, even though the carriage wheel is down. The requirement is that the wings should be blocked from being lowered to the fully down, fully operational position, so long as the carriage wheel remains down. The button-valves 35L,35R define the pre-determined hight.

The button valves 35L,35R allow downwards motion of the wings to take place, so long as the wings remain above a pre-set position. For example, as mentioned, the pre-set position may be defined as the position where the wings lie sloping upwards at an angle of five degrees. The button valves are set so as to change their hydraulic status or condition when the wings lie at the five-degree slope.

With the wings above five degrees, the button-valves 35L,35R connect conduit TB to the second by-pass conduits 49L,49R. Thus, fluid may be pumped to and from either side of the wing-rams 36L,36R, irrespective of the check valves 47 and the pilot valves 43L,43R, and therefore the driver may move the wings up or down, by pressurising TA or TB. However, he cannot make the wings go below the five-degree position, because if the wing drops below the five-degree position, the button-valves 35L,35R revert to their wings-down status, which closes the 2nd by-pass conduits 49L,49R.

To summarise: when the wheel 29 is down, the wings cannot be lowered below the five-degree position, because: below five-degrees, the button valves block flow through the 2nd by-pass conduits 49L,49R; the check-valves 47 close the 1st by-pass conduits 45L,45R; and the closed pilot-valves 43L,43R complete the closure of the conduits 40UL, 40UR. When the wheel 29 is up (FIG. 6), on the other hand, the wings can be lowered down into operational alignment with the centre-section 27M, by pressurising TA, and then the pressure in the wing-rams is controlled by the regulator 37.

Figure 5:
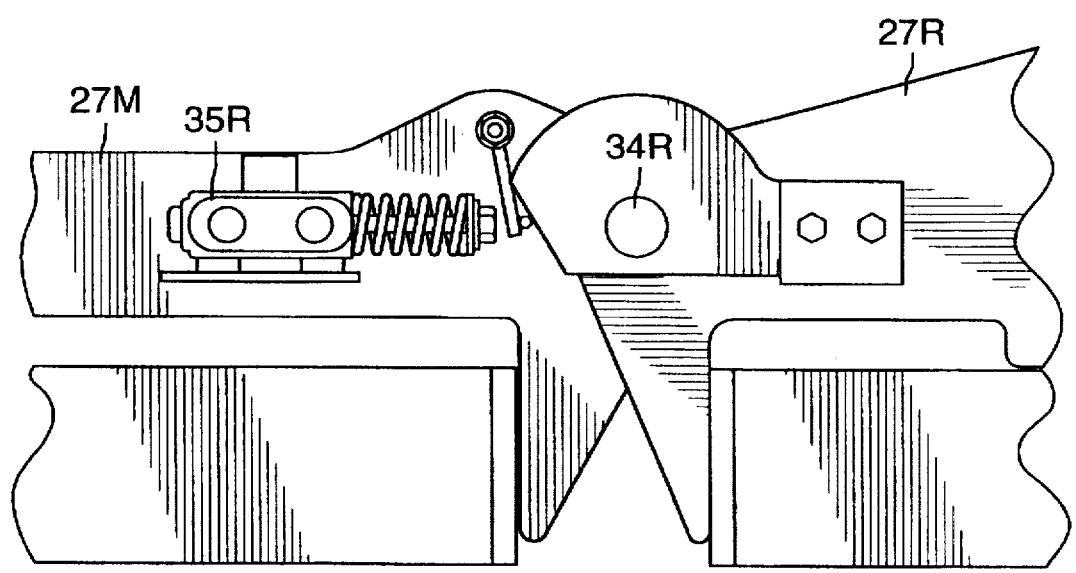
FIG. 5 is a close up of the area of the apparatus of FIG. 1 at which one of the wing-sections is hinged to the main section.

As shown in FIG. 5, the button-valves 35L,35R may be adjusted so as to trip at the five-degree slope of the wings, or at such other condition as deemed appropriate.

As shown in FIG. 1, the press-down actuator-ram 32, which acts between the air-cart 24 and the centre-section 27M of the tool-bar, is a component of the securement means (in this case a three-point hitch means) 28. In FIG. 1, the carriage wheel 29 is raised and lowered by means of the carriage-ram 30. However, in an alternative apparatus, the two rams 30,32 may be combined. In that case, the carriage wheel may be dispensed with. To produce the non-operational condition, the driver simply raises the centre-section clear of the ground by means of the (combined) ram and the three-point hitch; for the operational condition, the (combined) ram forces the tool-bar downwards, reacting the downwards force on the tool-bar as an upwards force on the air-cart, as before. The pilot pressure in the hydraulic circuit is now sensed as the pressure in the up-side of the (combined) ram. In fact, the FIG. 6 circuit would still be suitable: the component shown as the carriage-ram 30 would simply be the combined ram.

We claim:

1. Apparatus for applying down-pressure to a tool-bar of an agricultural implement, wherein:

the tool-bar is in sections, being a main section and a wing-section;

each section of the tool-bar is provided with ground-engaging elements;

the apparatus includes an operable means for raising the wing-section, relative to the main section, to a stowed condition, and for lowering the wing-section to an operational condition in which the wing-section is in co-operative alignment with the main section;

the apparatus includes an operable wing-press-down actuation means, which is effective, when operated, and when the wing is in the operational condition, to apply a wing-press-down-force onto the wing-section in a direction to urge the ground-engaging elements thereon downwards;

the apparatus includes a means for directing at least a potion of the upwards reaction to the aforesaid wing-press-down-force against the main-section;

the apparatus includes a wing-press-down-force-regulator, which is effective, when the wing is in the operational condition, to control and regulate the wing-press-down-force, to a level at which the elements can effectively work the ground, and to do so over an operational range of radical movement;

the aforesaid operational range of vertical movement being a range of movement between the main section and the wing-section, in which the sections remain in co-operative alignment during operational use of the apparatus in working the ground;

and the apparatus includes an operable wing blocking means, which is effective, when operated, to block downwards movement of the wing-section below a predetermined height of the wing-section, being a height intermediate between the stowed condition and the operational condition of the wing-section.

2. Apparatus of claim 1, wherein:

the apparatus includes a main-section support means, for supporting the main-section of the tool-bar which is movable between a support position, in which the main-section support means is effective to relieve at least some of the weight of and on the main section, and a retracted operational position, in which the support means leaves the tool-bar unsupported to the extent that, when the support means is in the retracted operational position, the elements are free to engage and work the ground;

the apparatus includes a means for indicating the position of the main-section support means, which, when the support means is in the support position, is effective to issue a signal indicative of same;

and the aforesaid wing blocking means is operable responsively to the aforesaid signal.

3. Apparatus of claim 2, wherein the main-section support means comprises a carriage wheel, which is lowerable relative to the main section to the extent that, when lowered, the ground-engaging elements are supported clear of the ground.

4. Apparatus of claim 2, wherein the arrangement of the apparatus is such that, when the wing blocking means is operated, the means for raising the wing-section remains free to raise the wing-section to the stowed condition, and to lower the wing-section down as far as the predetermined height of the wing.

5. Apparatus of claim 2, wherein:

the apparatus Includes a double-acting hydraulic ram, termed the wing-ram, which serves as the aforesaid wing-press-down-actuation means and as the aforesaid means for raising and lowering the wing-section;

the apparatus includes a wing-up conduit and a wing-down conduit, which are connected respectively one to each side of the wing-ram;

the wing-down conduit is so arranged in the apparatus that supplying pressurised fluid in the wing-down conduit is effective to urge the wing-section downwards;

the wing-up conduit is so arranged in the apparatus theft supplying pressurised fluid in the wing-up conduit is effective to urge the wing-section upwards;

the means for raising and lowering the wing-section include means for supplying hydraulic pressure appropriately to the wing-down and wing-up conduits;

and the wing-press-down actuation means includes means for supplying hydraulic pressure to the wing-down conduit.

6. Apparatus of claim 5, wherein:

the wing-press-down-force-regulator comprises a hydraulic pressure-reducing-pressure-relieving valve, which is operatively connected into the wing-down conduit;

the wing-press-down-force-regulator includes means for adjusting the regulator to a set pressure, and the regulator is effective to regulate the pressure in the wing-down conduit to the set pressure;

and the regulator is of such a structure as to be effective to dump excess hydraulic fluid from the wing-down conduit in the event the pressure in the wing-down conduit should rise above the set pressure.

7. Apparatus of claim 6, wherein:

the apparatus includes a hydraulic ram means for raising and lowering the main-section support means, termed the carriage-ram, and includes a carriage-down conduit and a carriage-up conduit connected thereto; the carriage-down conduit is so arranged in the apparatus that supplying pressurised fluid in the carriage-down conduit is effective to lower the main-section support means to the support position;

the carriage-up conduit is so arranged in the apparatus that supplying pressurised fluid in the carriage-up conduit is effective to raise the mains-section support means to the retracted operational position;

the means for raising and lowering the main-section support means includes a means for supplying pressure appropriately to the carriage-down and carriage-up conduits;

the means for indicating the position of the main-section support means comprises a means for sensing differences in pressure in the carriage-up and carriage-down conduits.

8. Apparatus of claim 7, wherein the wing-blocking means includes a signal-operated on/off valve, which is operable responsively to said signal, and which is connected into the wing-up conduit;

the apparatus is so arranged that, when the means for indicating the position of the main-section support means indicates that the support means is in the support position, the means is effective, in response to the aforesaid indication, to operate the on/off valve in the wing-up conduit to an OFF-condition, in which the wing-up conduit is blocked to the passage of hydraulic fluid.

9. Apparatus of claim 8, wherein:

the wing-up conduit includes a first by-pass conduit, arranged in parallel with the said signal-operated on/off valve;

the first by-pass conduit has a one-way or check valve, so arranged as to permit pressurised hydraulic fluid to flow into the wing-ram, along the wing-up conduit, in a direction to raise the wing-section.

10. Apparatus of claim 9, wherein:

the wing-up conduit includes a second by-pass conduit, arranged in parallel with the on/off valve;

the second by-pass conduit has a physical-position operated on/off valve;

the valve is so located in the apparatus as to be operated to the ON-condition, in which hydraulic fluid can pass along the by-pass conduit, into and out of the wing-ram, when the wing is physically positioned above the aforesaid predetermined level, and to be operated to the OFF-condition when the wing is physically positioned below the aforesaid predetermined level.

11. Apparatus of claim 10, wherein:

the wing-section is in two wings, left and right, each with a respective wing-ram, wing-up conduit and wing-down conduit;

the left and right wing-down conduits are connected together, whereby the wing-rams are supplied with the same pressure from the wing-press-down-force regulator;

the left and right wing-up conduits are separate, each having respective independent wing blocking means, and first and second by-pass conduits.

12. Apparatus of claim 2, wherein:

the apparatus includes an operable main-section-press-down actuation means, which is effective, when operated, to apply a main-section-press-down-force onto the main section of the tool-bar in a direction to urge the elements thereon downwards;

the apparatus includes a means for directing at least a portion of the upwards reaction to said force against a suitable heavy weight;

and the main-section-press-down actuation means comprises also the main-section support means.

13. Apparatus of claim 2, wherein:

the apparatus includes an operable main-section-press-down actuation means, which is effective, when operated, to apply a main-section-press-down-force onto the main section of the tool-bar in a direction to urge the elements thereon downwards;

the apparatus includes a means for directing at least a portion of the upwards reaction to said force against a suitable heavy weight.

\* \* \* \* \*